United States Patent
Li et al.

(10) Patent No.: US 12,271,023 B2
(45) Date of Patent: Apr. 8, 2025

(54) METHOD OF MANUFACTURING A MIDDLE BEZEL, BACKLIGHT MODULE, AND DISPLAY DEVICE THEREOF

(71) Applicant: SHENZHEN TCL DIGITAL TECHNOLOGY LTD., Shenzhen (CN)

(72) Inventors: Bing Li, Shenzhen (CN); Liqiang Liu, Shenzhen (CN); Limin Xiao, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 60 days.

(21) Appl. No.: 18/267,236

(22) PCT Filed: Aug. 19, 2021

(86) PCT No.: PCT/CN2021/113616
§ 371 (c)(1),
(2) Date: Jun. 14, 2023

(87) PCT Pub. No.: WO2022/142387
PCT Pub. Date: Jul. 7, 2022

(65) Prior Publication Data
US 2023/0384509 A1    Nov. 30, 2023

(30) Foreign Application Priority Data
Dec. 29, 2020  (CN) .......................... 202011603897.9

(51) Int. Cl.
*F21V 8/00*     (2006.01)
*G02F 1/1333*   (2006.01)

(52) U.S. Cl.
CPC ..... *G02B 6/0088* (2013.01); *G02F 1/133314* (2021.01); *G02F 1/133317* (2021.01); *G02F 2202/28* (2013.01)

(58) Field of Classification Search
CPC ............. G02B 6/0088; G02F 1/133314; G02F 1/133317; G02F 2202/28; G02F 1/133325;
(Continued)

(56) References Cited

U.S. PATENT DOCUMENTS

| | | | |
|---|---|---|---|
| 2008/0032093 A1 | 2/2008 | Deng et al. | |
| 2009/0122236 A1* | 5/2009 | Shutou ................ | G02F 1/13363 359/489.03 |

(Continued)

FOREIGN PATENT DOCUMENTS

| | | |
|---|---|---|
| CN | 101792644 A | 8/2010 |
| CN | 107896261 A | 4/2018 |

(Continued)

OTHER PUBLICATIONS

International Search Report in International application No. PCT/CN2021/113616,mailed on Oct. 26, 2021.
Written Opinion of the International Search Authority in International application No. PCT/CN2021/113616, mailed on Oct. 26, 2021.

(Continued)

*Primary Examiner* — Tracy Y. Li
(74) *Attorney, Agent, or Firm* — The Roy Gross Law Firm, LLC; Roy D. Gross

(57) ABSTRACT

The present disclosure provides a method of manufacturing a middle bezel, a backlight module, and a display device thereof. The method includes: providing a bezel body, a film layer, and a hot-melt adhesive; heating the hot-melt adhesive, coating a heated hot-melt adhesive on a side of the bezel body, and then covering the heated hot-melt adhesive with a film layer to obtain a film-covered bezel body; and curing the heated hot-melt adhesive in the film-covered bezel body to obtain the middle bezel.

17 Claims, 5 Drawing Sheets

(58) Field of Classification Search
CPC ..... H04M 1/022; H04M 1/0266; Y02E 10/50; H04N 5/64
See application file for complete search history.

(56) References Cited

U.S. PATENT DOCUMENTS

| | | |
|---|---|---|
| 2012/0251828 A1 | 10/2012 | Hsu et al. |
| 2015/0253487 A1* | 9/2015 | Nichol ................. G02B 6/0018 362/610 |
| 2018/0120498 A1* | 5/2018 | Tanaka ................... G02B 6/005 |
| 2020/0201121 A1* | 6/2020 | Huang .............. G02F 1/133608 |
| 2021/0063789 A1* | 3/2021 | Li .............................. C09J 7/10 |
| 2021/0165266 A1* | 6/2021 | Nakakomi ........ G02F 1/133308 |

FOREIGN PATENT DOCUMENTS

| | | | |
|---|---|---|---|
| CN | 209331615 | 9/2019 | |
| CN | 210222417 U | 3/2020 | |
| CN | 110967856 A | 4/2020 | |
| CN | 211980040 U | 11/2020 | |
| JP | H10157006 | 6/1998 | |
| JP | 2016204541 | 12/2016 | |
| WO | WO-2018221372 A1 * | 12/2018 | ......... B32B 37/1207 |

OTHER PUBLICATIONS

Chinese Office Action issued in corresponding Chinese Patent Application No. 202011603897.9 dated Feb. 11, 2023, pp. 1-5.
European Search Report of EP 21913134.9 dated Nov. 4, 2024 12 pages.

* cited by examiner

METHOD OF MANUFACTURING A MIDDLE BEZEL, BACKLIGHT MODULE, AND DISPLAY DEVICE THEREOF

CROSS-REFERENCE TO RELATED APPLICATION

This application is a National Phase of PCT Patent Application No. PCT/CN2021/113616 having International filing date of Aug. 19, 2021, which claims priority to Chinese Patent Application No. 202011603897.9, filed in the China National Intellectual Property Administration on Dec. 29, 2020, and entitled: "METHOD OF MANUFACTURING A MIDDLE BEZEL, BACKLIGHT MODULE, AND DISPLAY DEVICE THEREOF", the contents of which are all incorporated herein by reference in their entirety.

TECHNICAL FIELD

The present disclosure relates to a technical field of backlight module, and in particular to a method of manufacturing a middle bezel, a backlight module, and a display device thereof.

BACKGROUND

In recent years, the existing television configuration has been developed toward a full-screen bezel-less structure. In the prior art, middle bezels such as an injection-molded plastic middle bezel, an extrusion-molded middle bezel, and an integrated structure of a back plate and a middle bezel have emerged. These structures are prepared by (spray) coating, and the yield of spray coating is lower.

Therefore, the prior art still needs to be improved and developed.

SUMMARY

Technical Problem

A method of manufacturing a middle bezel, a backlight module, and a display device thereof are provided to solve the problem of low yield of spray coating the middle bezel in the prior art.

Problem Solution

Technical Solution

According to a first aspect, an embodiment of the present disclosure provides a method of manufacturing a middle bezel useful for a backlight module, the method includes:
  providing a bezel body, a film layer, and a hot-melt adhesive;
  heating the hot-melt adhesive, coating the heated hot-melt adhesive on a side of the bezel body, and then covering the heated hot-melt adhesive with the film layer, to obtain a film-covered bezel body; and
  curing the heated hot-melt adhesive of the film-covered bezel body to obtain the middle bezel.

As a further improvement, the hot-melt adhesive is a polyurethane reactive hot-melt adhesive; and a step of curing the heated hot-melt adhesive of the film-covered bezel body to obtain the middle bezel includes:
  keeping the film-covered bezel body at a preset temperature for a preset time, so that the heated polyurethane reactive hot-melt adhesive and water molecules in air are crosslinked and cured to obtain the middle bezel.

As a further improvement, the preset temperature ranges from 10 to 50° C.; and the preset time ranges from 8 to 100 hours; and/or
  a temperature of the heating of the hot-melt adhesive ranges from 80 to 150° C.

As a further improvement, a step of providing the bezel body includes:
  providing a section material; and
  performing a processing treatment and a prime coating treatment on the section material to obtain a bezel body; wherein a polyester-based primer is used in the prime coating treatment, and the processing treatment comprises: processing a pre-foldable line and/or a V-shape notch capable of bending; and/or,
  forming an accommodating groove on a side of the bezel body facing away from the film layer.

As a further improvement, the bezel body is selected from one or more of an aluminum-based bezel body, an iron-based bezel body, a titanium-based bezel body, or a copper-based bezel body; and/or,
  the film layer includes one or more of a PVC film layer, a PET film layer, or a PVF film layer.

According to a second aspect, an embodiment of the present disclosure provides a backlight module including:
  a back plate; and
  a middle bezel prepared by the method of manufacturing the middle bezel according to any one of the above, the middle bezel being provided on a side of the back plate;
  wherein the bezel body is connected to the back plate; the film layer is located on a side of the bezel body facing away from the back plate.

As a further improvement, the backlight module further includes:
  an optical assembly;
  the back plate includes:
  a bottom plate;
  a foldable edge provided at an edge of the bottom plate; and
  a support connected to the foldable edge, and used for supporting the optical assembly.

As a further improvement, a height of the foldable edge is equal to a distance between the support and the bottom plate; and
  the bezel body is connected to a side of the foldable edge facing away from the bottom plate, and the bezel body extends above the support.

As a further improvement, the bezel body includes:
  a connection portion connected to the foldable edge; and
  a stopper portion on a side of the connection portion facing the optical assembly; and
  wherein a first end of the stopper portion is connected to the connection portion, and a second end of the stopper portion extends to an upper surface of the support to limit the optical assembly.

As a further improvement, an arc-shape connection is disposed between the connection portion and the stopper portion.

As a further improvement, a height of the foldable edge is greater than a distance between the support and the bottom plate; and
  the bezel body is connected to a side of the foldable edge facing away from the bottom plate, the bezel body is provided with an accommodating groove, a connector is provided in the accommodating groove, and the connector is used for connecting the bezel body and the foldable edge.

As a further improvement, the bezel body is provided with a notch, and the notch communicates with the accommodating groove.

As a further improvement, a shape of the accommodating groove is a semi-circular shape, a circular shape, a circular arc shape, a triangular shape, or a trapezoidal shape.

As a further improvement, the connector is double-sided adhesive tape or glue.

As a further improvement, the optical assembly includes a reflective sheet, a light guide plate, and an optical film.

As a further improvement, the support is a support plate.

In a third aspect, an embodiment of the present disclosure provides a display device including a backlight module according to any one of the above.

Beneficial Effect

After a heated hot-melt adhesive is coated on a bezel body, a film layer is covered, so that the film layer is connected to the bezel body to obtain a middle bezel, and the bezel body is protected and decorated by the film layer. The step of spray-coating may be omitted by covering the film layer on a side of the bezel body. However, in the present disclosure, compared to the spray coating process in the related art, it is simpler to cover the film layer on the bezel body to obtain the middle bezel than the spray-coating method, and the yield is higher.

BRIEF DESCRIPTION OF THE DRAWINGS

Description of Drawings

Figure 1:
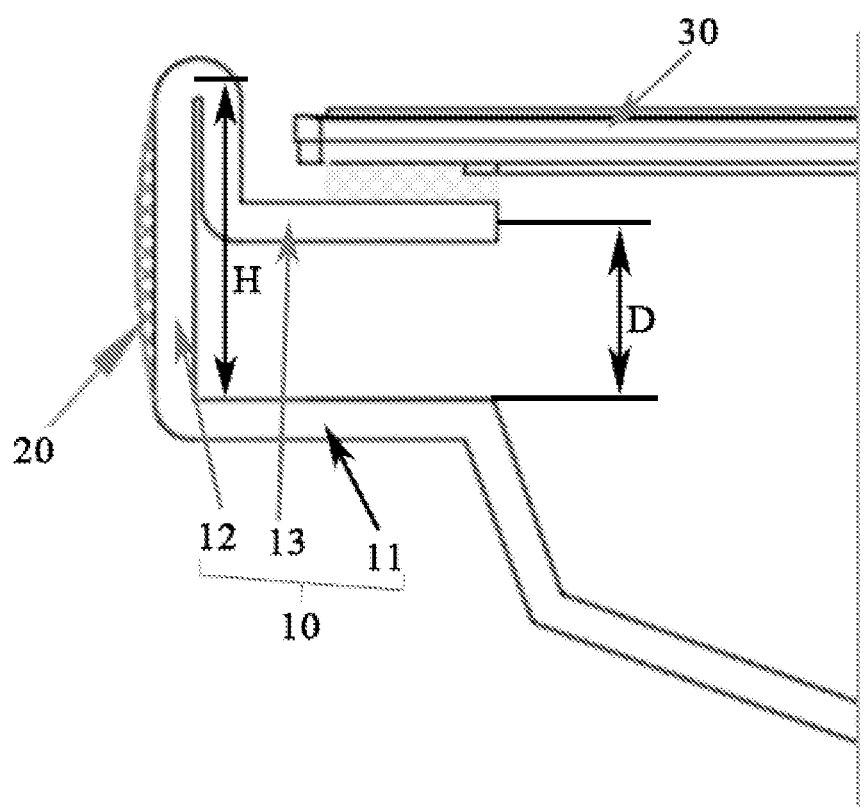

FIG. 1 is a schematic view of a first structure of a backlight module according to the present disclosure.

Figure 2:
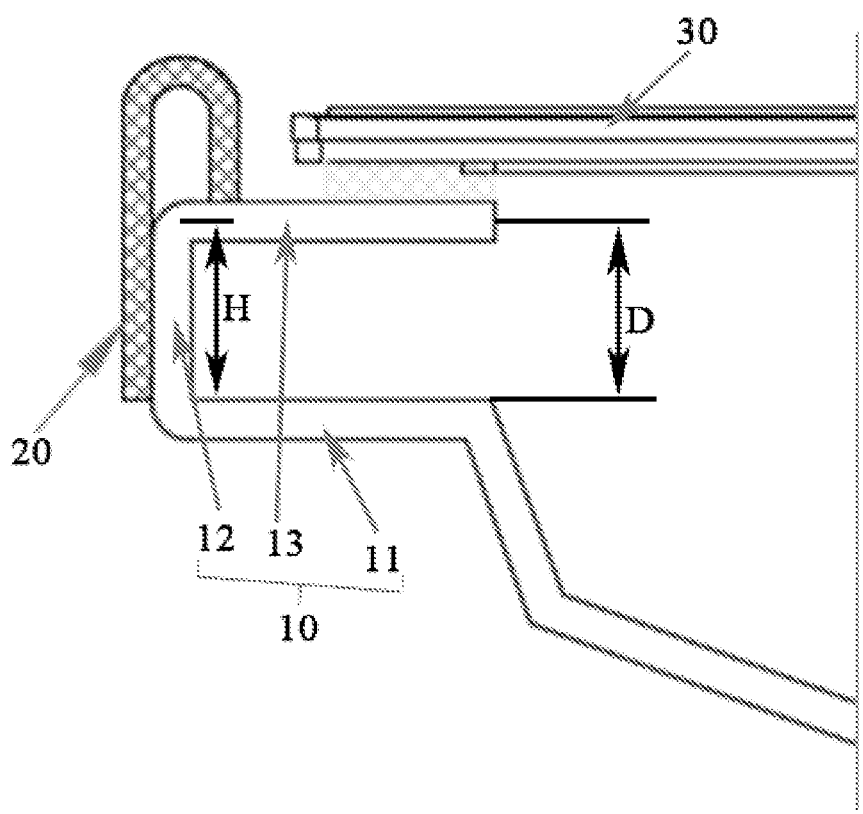

FIG. 2 is a schematic view of a second structure of the backlight module according to the present disclosure.

Figure 3:
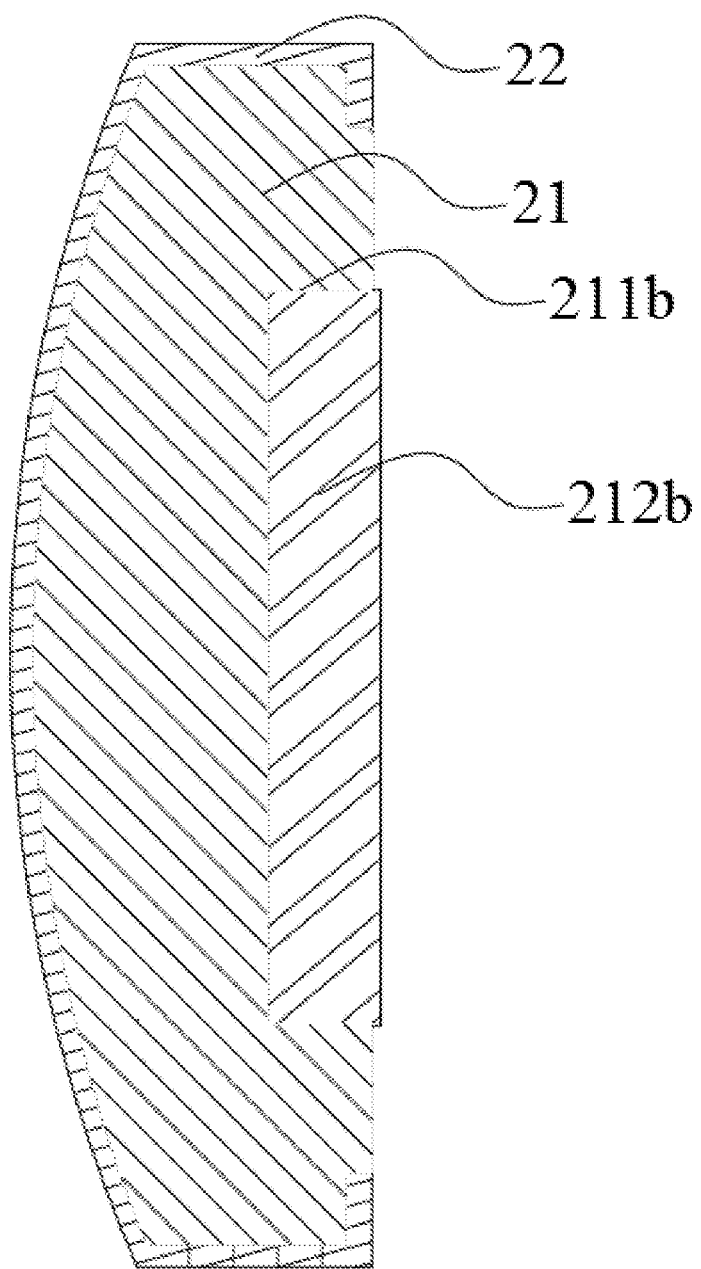

FIG. 3 is a schematic view of a first structure of a middle bezel according to the present disclosure.

Figure 4:
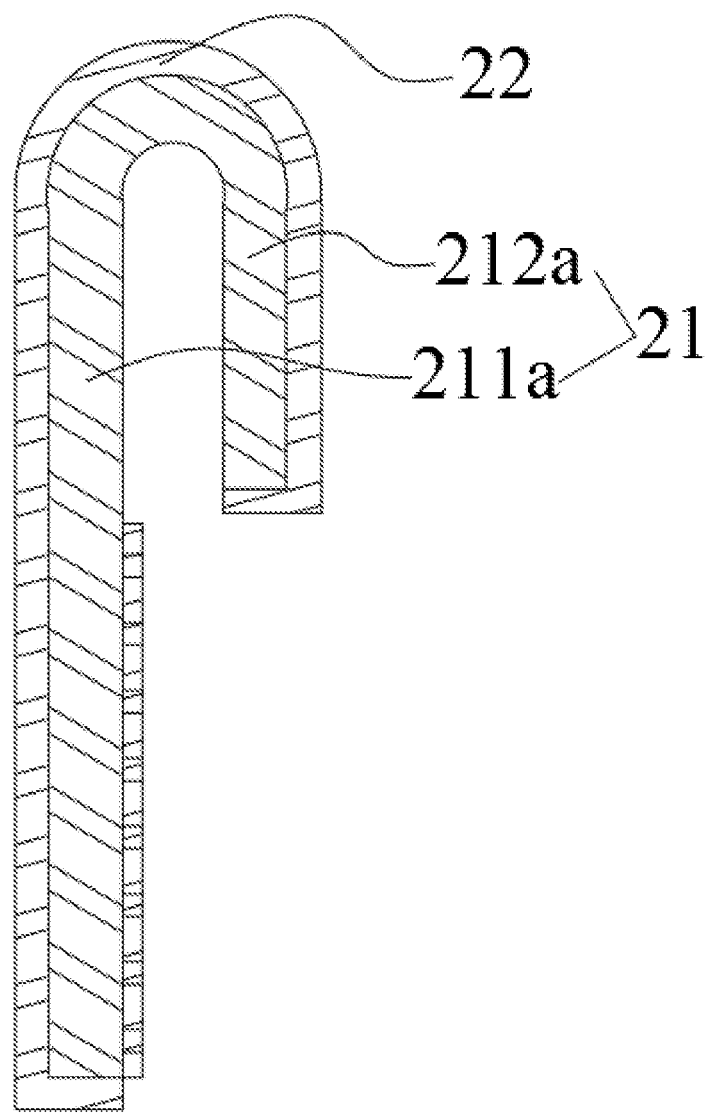

FIG. 4 is a schematic view of a second structure of the middle bezel of the present disclosure.

Figure 5:
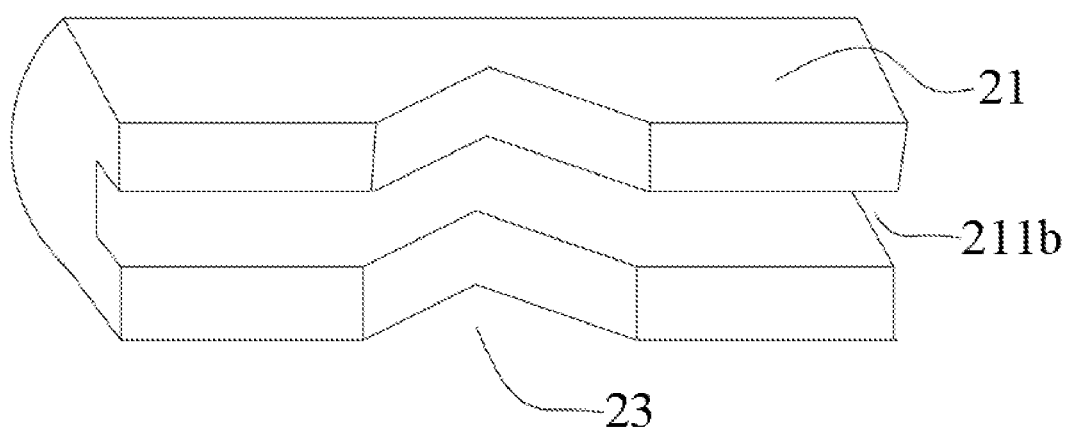

FIG. 5 is a schematic view of a third structure of the middle bezel of the present disclosure.

LIST OF REFERENCE SIGNS

Back plate; 11. Bottom plate; 12, Foldable edge; 13. Support; 20. Middle bezel; 21. Bezel body; 211a. Connection portion; 212a. Stopper portion; 211b. Accommodating groove; 212b. Connector; 22. Film layer; 23. Notch; 30. Optical assembly; D. Distance between the support and the bottom plate; H. Height of the foldable edge.

DETAILED DESCRIPTION

In order to make the objects, technical solutions, and advantages of the present disclosure clearer and more explicit, the present disclosure will be described in further detail with reference to the accompanying drawings and embodiments below. It is to be understood that the specific embodiments described herein are merely illustrative of the disclosure and are not intended to limit the disclosure.

Various non-limiting embodiments of the present disclosure will now be described in detail with reference to the accompanying drawings.

As shown in FIGS. 1 and 2, the present disclosure provides a method of manufacturing a middle bezel for a backlight module.

The manufacturing method of the middle bezel of the present disclosure includes the following steps.

At step S100, a bezel body, a film layer, and a hot-melt adhesive are provided.

At step S200, the hot-melt adhesive is heated, the heated hot-melt adhesive is coated on a side of the bezel body, and then the film layer is covered on the heated hot-melt adhesive to obtain a film-covered bezel body.

At step S300, the heated hot-melt adhesive of the film-covered bezel body is cured to obtain the middle bezel.

Specifically, after the heated hot-melt adhesive is coated on the bezel body, the film layer is covered, so that the film layer is connected to the bezel body to obtain a middle bezel, and the bezel body is protected and decorated by the film layer. The step of spray coating may be omitted by the method of covering the film layer on a side of the bezel body. It is apparent that in the present disclosure, compared to the spray coating in the related art, it is simpler to obtain the middle bezel by covering a film layer than spray coating method, and the yield is higher.

Hot-melt adhesives refer to adhesives that may achieve adhesion after being heated and melted. Generally, hot-melt adhesives are plastic adhesives. Hot-melt adhesives may achieve rapid bonding, and it only takes a few tens of seconds, or even a few seconds, from the applying to cooling and bonding. The hot-melt adhesive has a wide application range for bonding, and is suitable for bonding between various bezel bodies and various film layers. Furthermore, some hot-melt adhesives may be repeatedly heated and used for bonding many times, that is, once a part of the area is not firmly bonded, the hot-melt adhesives in the part of the area may be reheated and reused for bonding.

Specifically, the hot-melt adhesive includes an ethylene vinyl-acetate polymer hot-melt adhesive (i.e., EVA (Ethylene Vinyl-acetate Copolymer) hot-melt adhesive), a polyamide hot-melt adhesive (i.e., PA (Polyamide) hot-melt adhesive), a polyolefin hot-melt adhesive (i.e., PO/APAO (Polyolefin/Amorphous Poly Alpha Olefin) hot-melt adhesive), or a polyurethane hot-melt adhesive (i.e., PUR (Polyurethane) hot-melt adhesive).

In one example in embodiments of the present disclosure, the hot-melt adhesive is a polyurethane reactive hot-melt adhesive.

The polyurethane reactive hot-melt adhesive refer to a polyurethane hot-melt adhesive cured by reactive crosslinking during bonding. The polyurethane reactive hot-melt adhesives include moisture-curable polyurethane hot-melt adhesives containing terminal —NCO groups, blocked polyurethane hot-melt adhesives, prepolymer hot-melt adhesives containing latent curing agents and terminal —NCO groups, silicone-terminated polyurethane hot-melt adhesives, polyurethane hot-melt adhesives containing terminal —SH groups.

The moisture-curable polyurethane hot-melt adhesives containing terminal —NCO groups may be chemically reacted with the water molecules contained in the air and water adsorbed on the surface of the bezel body, to form urea bonds for crosslinking and curing during bonding. The blocked polyurethane hot-melt adhesive blocks the terminal —NCO groups in the polyurethane prepolymer, the deblocking occurs only when the blocked polyurethane hot-melt adhesive is heated to a certain temperature, and the active —NCO groups are regenerated, and can be chemically crosslinked with hydrogen-containing compounds such as polyols, amines, and water. In order to improve the polyurethane hot-melt adhesive, latent curing agents, terminal siloxane groups, terminal —SH groups, and the like may be added.

In one example in embodiments of the present disclosure, the film layer includes one or more of a PVC film layer, a PET film layer, or a PVF film layer.

Specifically, the film layer is used for decoration. The PVC film layer refers to a film layer made of a polyvinyl chloride, PVC (Polyvinyl chloride) material. The PET film layer refers to a film layer made of a polyterephthalic acid-based PET (Polyethylene terephthalate) material. The PVF film layer refers to a film layer made of a polyvinyl formal PVF (Polyvinyl formal) material. The material of the film layer may be determined as needed, and different film layers may be selected.

In one example in embodiments of the present disclosure, the step S100 of providing the bezel body, the film layer, and the hot-melt adhesive includes:

Step S110: a section material is provided.

Step S120: a processing treatment and a prime coating treatment are performed on the section material to obtain the bezel body; a polyester-based primer may be used in the prime coating treatment, and the processing treatment includes processing a pre-foldable line that can be bent and/or processing a V-shape notch.

Specifically, in one example in embodiments of the present disclosure, the bezel body 21 is a rigid bezel body.

Specifically, in the related art, the injection-molded bezel and the extrusion-molded bezel have a poor appearance, the thermal expansion deformation is large, and formed corners of the integral structure of the middle bezel 20 and the back plate 10 may be prone to collapse and deformation. In the present disclosure, a rigid bezel body is used for the middle bezel 20, and the rigid bezel body refers to a bezel body that is hard and not easily deformable. Because the rigid bezel body has a relatively strong rigidity, the rigid bezel body does not deform. Therefore, when the rigid bezel body is used, it is advantageous to ensure that the side surface of the back plate 10 is relatively high in rigidity and does not deform, so that the backlight module will not be damaged.

Further, an accommodating groove is formed at a side of the bezel body facing away from the film layer to facilitate fixing of the connecting member.

In one example in embodiments of the present disclosure, the rigid bezel body includes one or more of an aluminum-based bezel body, an iron-based bezel body, a titanium-based bezel body, or a copper-based bezel body.

For example, the aluminum-based bezel body includes an aluminum bezel body and an aluminum alloy bezel body. The aluminum alloy bezel body refers to a bezel body made of an aluminum alloy material, and the aluminum bezel body refers to a bezel body made of an aluminum material. The iron-based bezel body includes an iron bezel body and an iron alloy bezel body. The iron alloy bezel body refers to a bezel body made of an iron alloy material, and the iron bezel body refers to a bezel body made of an iron material. The titanium-based bezel body includes a titanium bezel body and a titanium alloy bezel body. The titanium alloy bezel body refers to a bezel body made of a titanium alloy material, and the titanium bezel body refers to a bezel body made of a titanium material. The copper-based bezel body includes a copper bezel body and a copper alloy bezel body. The copper alloy bezel body refers to a bezel body made of a copper alloy material, and the copper bezel body refers to a bezel body made of a copper material. The aluminum-based bezel body is preferably used because the cost of the aluminum-based bezel body is lower, and the weight of the aluminum-based bezel body is smaller.

The bezel body is selected from one or more of an aluminum-based bezel body, an iron-based bezel body, a titanium-based bezel body, or a copper-based bezel body. Therefore, when a section material is provided, the material of the section material is determined according to the material of the desired bezel body, that is, the section material is selected from one or more of an aluminum-based section material, an iron-based section material, a titanium-based section material, or a copper-based section material.

When the section material is processed, the pre-foldable line and/or the V-shape notch which may be bent is first processed, and then the section material may be bent at the pre-foldable line or the V-shape notch to form a bezel structure. The bezel structure is then subjected to a prime coating treatment to obtain a bezel body. The prime coating treatment refers to that a solution-like substance is pre-coated on the bezel structure during coating of the adhesive, and a firm paint film is formed after curing of the solution-like substance. Generally, the primer is used to perform the prime coating treatment, the primer is evenly covered on the surface of the bezel structure by spraying and brushing, and then the hot-melt adhesive is applied, so that the bezel structure and the hot-melt adhesive may be well connected, and the formed bezel body is firm and stable for a long time.

The primer includes a polyester-based primer, an epoxy-based primer, or a silane coupling agent. For example, the polyester-based primer is used in the present disclosure, and can serve as a roughening agent, a surface cleaning agent, and a pre-coating agent, thereby further enhancing the peel strength of the combination of the film layer and the bezel body.

In one example in embodiments of the present disclosure, step S300 of curing the heated hot-melt adhesive in the film-covered bezel body to obtain the middle bezel includes:

Step S310: the film-covered bezel body is kept at a preset temperature for a preset time, to crosslink and cure the heated polyurethane reactive hot-melt adhesive and water molecules in air to obtain the middle bezel.

In order to sufficiently cure the polyurethane reactive hot-melt adhesive, the film-covered bezel body is kept at a preset temperature for a preset time, to crosslink and cure the heated polyurethane reactive hot-melt adhesive and water molecules in air to obtain the middle bezel. In order to accelerate the curing of the polyurethane reactive hot-melt adhesive, the humidity of the air may be increased, and thus sufficient water molecules participate in the crosslinking and curing.

In one example in embodiments of the present disclosure, the preset temperature ranges from 10 to 50° C.; the preset time ranges from 8 to 100 hours. Alternatively, the preset temperature may also range from 10 to 30° C., that is, curing of the hot-melt adhesive may be achieved at a daily temperature without heating or cooling to ensure the preset temperature. The preset time ranges from 8 to 100 hours, and the preset time may be determined as required.

In one implementation of an embodiment of the present disclosure, the temperature of the heating of the hot-melt adhesive ranges from 80 to 150° C. The specific temperature of the heating may be determined according to the polyurethane reactive hot-melt adhesive employed.

For example, after the film layer is covered on the bezel body, the bezel body covered with the film layer is kept in a heat preservation workshop for 72 hours, and the hot-melt adhesive is sufficiently cured. The adhesion test of the obtained middle bezel may reach the grade of 5B, the peel strength can be 3 N/mm, and it is resistant to a high temperature test of 120° C./30 min.

Based on the middle bezel of the above-described embodiment, as shown in FIGS. 1 and 2, the present disclosure provides a backlight module including:

a back plate 10; and a middle bezel 20 formed by a method of manufacturing the middle bezel according to the above embodiment. The middle bezel 20 is provided on a side of the back plate 10; the bezel body 21 is connected to the back plate 10; and the film layer is located on a side of the bezel body 21 facing away from the back plate 10.

Specifically, the middle bezel 20 is provided on the side of the back plate 10. Before the middle bezel 20 is provided on the side of the back plate 10, the film layer may be provided on the bezel body 21 to obtain the middle bezel 20, and then the middle bezel 20 is provided on the side of the back plate 10, so that the step of the spray coating is omitted, and compared with spray coating, it is simpler to provide the film layer on the bezel body 21 with a higher yield.

In one implementation of an embodiment of the present disclosure, as shown in FIGS. 1 and 2, the backlight module further includes:

an optical assembly 30.

The back plate 10 includes:

a bottom plate 11;

a foldable edge 12 provided at an edge of the bottom plate 11; and a support 13 connected to the foldable edge 12, the support 13 is used for supporting the optical assembly 30.

Specifically, the optical assembly 30 may include a reflective sheet, a light guide plate, an optical film, and the like. The support 13 is located on the side of the foldable edge 12 facing the bottom plate 11, and the support 13 is provided around the optical assembly 30 and is connected to the edge of the lower surface of the optical assembly 30. The support 13 may be a support plate, and other shapes of the support 13 may be used. The foldable edge 12 is perpendicular to the bottom plate 11, the upper end of the foldable edge 12 is connected to the support 13, the lower end of the foldable edge 12 is connected to the bottom plate 11, the foldable edge 12 is formed by bending the edge of the plate body, and the unfolded portion of the plate body is the bottom plate 11.

In one example in embodiments of the disclosure, as shown in FIGS. 1 and 2, the height H of the foldable edge 12 is equal to the distance D between the support 13 and the bottom plate 11;

The bezel body 21 is connected to the side of the foldable edge 12 facing away from the bottom plate 11, and extends above the support 13.

Specifically, the height H of the foldable edge 12 refers to the distance D between the upper end of the foldable edge 12 and the bottom plate 11, and, of course, the distance D between the upper end of the foldable edge 12 and the lower end of the foldable edge 12. When the distance D between the support 13 and the bottom plate 11 is equal to the height H of the foldable edge 12, this means that the periphery of the optical assembly 30 above the support 13 is not obstructed. Therefore, it is necessary to extend the bezel body 21 above the support 13 to limit the degree of freedom of the optical assembly 30 in the horizontal direction.

In one example in embodiments of the present disclosure, as shown in FIGS. 2 and 4, the bezel body 21 includes:

a connection portion 211a connected to the foldable edge 12; and a stopper portion 212a located at a side of the connection portion 211a facing the optical assembly 30, wherein a first end of the stopper portion 212a is connected to the connection portion 211a, and a second end of the stopper portion 212a extends to the upper surface of the support 13 to limit the optical assembly 30.

Specifically, the connection portion 211a is connected to the side surface of the bottom plate 11, the upper end of the connection portion 211a is connected to the first end of the stopper portion 212a, and the second end of the stopper portion 212a may abut against the support member 13. The connection between the connection portion 211a and the stopper portion 212a is an arc-shaped transition. The stopper portion 212a is located on the side surface of the optical assembly 30 to limit the optical assembly 30.

In one example in embodiments of the present disclosure, as shown in FIGS. 1 and 3, the height H of the foldable edge 12 is greater than the distance D between the support 13 and the bottom plate 11.

The bezel body 21 is connected to a side of the foldable edge 12 facing away from the bottom plate 11, and the bezel body 21 is provided with a accommodating groove 211b, in which a connector 212b is provided, for connecting the bezel body 21 and the foldable edge 12.

Specifically, when the height H of the foldable edge 12 is greater than the distance D between the support 13 and the bottom plate 11, the portion of the foldable edge 12 protruding from the support 13 may limit the optical assembly 30, and therefore, the bezel body 21 only needs to be attached to the side of the foldable edge 12 facing away from the bottom plate 11. Specifically, the connector 212b may be used for connection, and the connector 212b includes double-sided adhesive tape, glue, or the like.

In one example in embodiments of the present disclosure, as shown in FIG. 3, the accommodating groove 211b includes one or more of a circular groove, a triangular groove, a trapezoidal groove, and a hemispherical groove. The shape of the accommodating groove 211b may be semi-circular, circular, arc-shaped, triangular, trapezoidal, hemispherical, or the like, and the shape of the accommodating groove 211b is determined as required.

In one example in embodiments of the present disclosure, as shown in FIG. 5, the bezel body 21 is provided with a notch which communicates with the accommodating groove 211b.

Specifically, the notch is provided in the bezel body 21, and the notch communicates with the accommodating groove 211b, so that the bezel body 21 may be adapted to two different sides by bending at the notch.

The backlight module of the present disclosure is described by taking a middle bezel with the accommodating groove as an example. The backlight module of the present disclosure is prepared by the following steps.

At step 1, the bezel body with the accommodating groove is produced by extrusion molding according to design requirements.

At step 2, the bezel body is simply machined, and a corner pre-foldable line or notch 23, such as a V-notch, is machined as shown in FIG. 5.

At step 3, the surface of the bezel body is cleaned, and if necessary, passivation or chemical prime coating pretreatment is added.

At step 4, a film layer is thermally covered or glued on the outer surface of the bezel body.

At step 5, double-sided adhesive tape or dispensing is applied to the accommodating groove of the film-covered bezel body (i.e., the middle bezel).

At step 6, the middle bezel is attached to the side of the back plate, and a structure having the back plate and the middle bezel may be obtained after pressing and fixing the middle bezel. On this basis, by adding other components, a complete backlight module may be formed.

Specifically, a VHB double-sided adhesive tape is used to bond the middle bezel to the side of the back plate, and the VHB double-sided adhesive tape is an acrylic high-strength adhesive tape. After 8 hours of bonding, a peel force of 180 degrees is required to be not less than 30 N/mm, and the thickness of the adhesive tape ranges from 0.15 to 1 mm.

The backlight module of the present disclosure has the following technical effects:

1. the decoration cost of the middle bezel structure in the back plate is reduced;
2. a lock screw structure is not required, and the appearance is beautiful;
3. compared to the extruded bezel, it may be made thinner and not easy to deform; and
4. requirements for a reliability testing of TV product can be met.

Based on the backlight module of the above embodiment, the present disclosure further provides a preferred embodiment of a display device:

A display device according to the present disclosure includes a backlight module according to any one of the above-described embodiments.

It should be understood that various technical features of the above-described embodiments may be arbitrarily combined. For the sake of brevity, all possible combinations of various technical features in the above-described embodiments are not described. However, the combinations of these technical features should be considered to be within the scope of the present specification as long as they do not contradict each other.

The above-described embodiments represent only a few embodiments of the disclosure, and the description thereof is more specific and detailed, but is not to be construed as a limitation on the scope of the disclosure. It should be noted that for those skilled in the art, several variations and modifications may be made without departing from the spirit and scope of the disclosure. Accordingly, the protection scope of the present disclosure should be governed by the appended claims.

What is claimed is:

1. A method of manufacturing a middle bezel useful for a backlight module, comprising:
   providing a bezel body, a film layer, and a hot-melt adhesive;
   heating the hot-melt adhesive, coating the heated hot-melt adhesive on a side of the bezel body, and covering the heated hot-melt adhesive with the film layer, to obtain a film-covered bezel body; and
   curing the heated hot-melt adhesive of the film-covered bezel body to obtain the middle bezel;
   wherein a step of providing the bezel body comprises:
   providing a section material; and performing a processing treatment and a prime coating treatment on the section material to obtain the bezel body; wherein a polyester-based primer is used in the prime coating treatment, and the processing treatment comprises: processing a pre-foldable line and/or a V-shape notch capable of bending.

2. The method according to claim 1, wherein the hot-melt adhesive is a polyurethane reactive hot-melt adhesive; and a step of curing the heated hot-melt adhesive of the film-covered bezel body to obtain the middle bezel comprises:
   keeping the film-covered bezel body at a preset temperature for a preset time, so that a heated polyurethane reactive hot-melt adhesive and water molecules in air are crosslinked and cured to obtain the middle bezel.

3. The method according to claim 2, wherein the preset temperature ranges from 10 to 50° C.; and the preset time ranges from 8 to 100 hours; and/or
   a temperature of the heating of the hot-melt adhesive ranges from 80 to 150° C.

4. The method according to claim 1, wherein a step of providing the bezel body comprises:
   forming an accommodating groove on a side of the bezel body facing away from the film layer.

5. The method according to claim 1, wherein the bezel body is one or more selected from an aluminum-based bezel body, an iron-based bezel body, a titanium-based bezel body, or a copper-based bezel body; and/or,
   the film layer comprises one or more of a PVC film layer, a PET film layer, or a PVF film layer.

6. A backlight module, comprising:
   a back plate; and
   a middle bezel prepared by the method of manufacturing the middle bezel according to claim 1, the middle bezel being provided on a side of the back plate;
   wherein the bezel body is connected to the back plate; the film layer is located on a side of the bezel body facing away from the back plate;
   wherein the bezel body is provided by providing a section material and performing a processing treatment and a prime coating treatment on the section material to obtain the bezel body; wherein a polyester-based primer is used in the prime coating treatment, and the processing treatment comprises: processing a pre-foldable line and/or a V-shape notch capable of bending.

7. The backlight module according to claim 6, wherein the backlight module further comprises an optical assembly, and the back plate comprises:
   a bottom plate;
   a foldable edge provided at an edge of the bottom plate; and
   a support connected to the foldable edge, and used for supporting the optical assembly.

8. The backlight module according to claim 7, wherein a height of the foldable edge is equal to a distance between the support and the bottom plate; and
   the bezel body is connected to a side of the foldable edge facing away from the bottom plate, and the bezel body extends above the support.

9. The backlight module according to claim 8, wherein the bezel body comprises:
   a connection portion connected to the foldable edge; and
   a stopper portion on a side of the connection portion facing the optical assembly; and
   wherein a first end of the stopper portion is connected to the connection portion, and a second end of the stopper portion extends to an upper surface of the support to limit the optical assembly.

10. The backlight module according to claim 9, wherein an arc-shape connection is disposed between the connection portion and the stopper portion.

11. The backlight module according to claim 7, wherein a height of the foldable edge is greater than a distance between the support and the bottom plate; and the bezel body is connected to a side of the foldable edge facing away from the bottom plate, the bezel body is provided with an accommodating groove, a connector is provided in the accommodating groove, and the connector is used for connecting the bezel body and the foldable edge.

12. The backlight module according to claim 11, wherein the bezel body is provided with a notch, and the notch communicates with the accommodating groove.

13. The backlight module according to claim 11, wherein a shape of the accommodating groove is a semi-circular shape, a circular shape, a circular arc shape, a triangular shape, or a trapezoidal shape.

14. The backlight module according to claim 11, wherein the connector is double-sided adhesive tape or glue.

15. The backlight module according to claim 7, wherein the optical assembly comprises a reflective sheet, a light guide plate, and an optical film.

16. The backlight module according to claim 7, wherein the support is a support plate.

17. A display device comprising the backlight module according to claim 6.

\* \* \* \* \*